Figure 1:
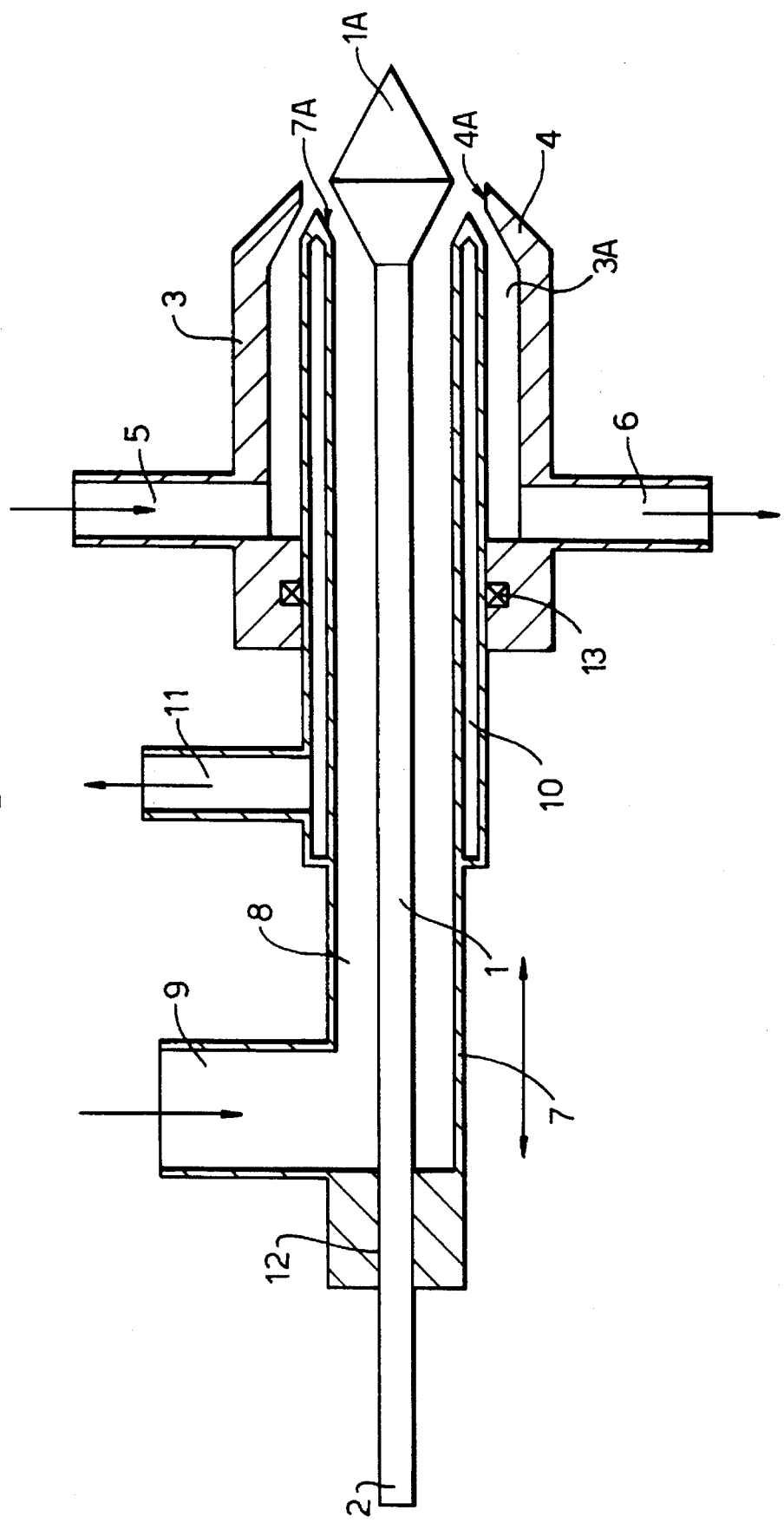

US005556653A

United States Patent [19]

Binley

[11] Patent Number: 5,556,653
[45] Date of Patent: Sep. 17, 1996

[54] EXTRUSION OF MATERIALS

[75] Inventor: Gary N. Binley, Kettering, United Kingdom

[73] Assignee: Good Humor-Breyers Ice Cream, Division of Conopco, Inc., Green Bay, Wis.

[21] Appl. No.: 410,196

[22] Filed: Mar. 24, 1995

[30] Foreign Application Priority Data

Mar. 30, 1994 [EP] European Pat. Off. ............. 94302294

[51] Int. Cl.$^6$ ............................. A23G 3/00; A23G 9/04
[52] U.S. Cl. .................. 426/101; 426/306; 426/307; 426/515; 426/516; 426/517; 426/524; 426/565
[58] Field of Search ..................... 426/91, 93, 95, 426/100, 101, 293, 302, 306, 307, 515, 516, 517, 524, 565–567

[56] References Cited

U.S. PATENT DOCUMENTS

| 3,757,085 | 9/1973 | Balaguer | 219/523 |
|---|---|---|---|
| 3,910,441 | 10/1975 | Bramming | 215/13 R |
| 4,659,580 | 4/1987 | Svengren | 426/516 |
| 4,786,243 | 11/1988 | Kehoe | 425/131.1 |
| 4,865,856 | 9/1989 | Groen | 426/231 |
| 5,137,675 | 8/1992 | Rabe | 264/171 |
| 5,198,239 | 3/1993 | Beavers | 426/517 |
| 5,356,648 | 10/1994 | Kortschot | 426/249 |

FOREIGN PATENT DOCUMENTS

| 2578718 | 9/1986 | France . |
|---|---|---|
| 3716362 | 11/1987 | Germany . |
| 664626 | 5/1979 | U.S.S.R. . |
| WO94/02027 | 2/1994 | WIPO . |

OTHER PUBLICATIONS

Derwent Abstract 10764C (Abstract of Russian patent SU–664626–A) Demidenko et al.
International Search Report in International Patent Application No. PCT/EP 95/01082.
Arbuckle, W. S., "Ice Cream", AVI Publishing Co., 1986, 4th Edition.
Hamilton, M., "Ice Cream Manufacture", *J. Soc. Dairy Technology*, (Feb. 1990), vol. 43 No. 1, pp. 17–20.
Kirk–Othmer Encyclopedia of Chenical Technology (2nd Edition) 1964, vol. 5, p. 363 et seq..
Allerton, J., "Chocolate and Cocoa Technology", *Elements of Food Technology*, pp. 579–600.
European Search Report in European Patent Application 94302294.7.
Abstract of FR 2 578 718.
Abstract of JP 55092656.
Abstract of JP 60041445.

*Primary Examiner*—Jeanette Hunter
*Attorney, Agent, or Firm*—James J. Farrell

[57] ABSTRACT

Ice confection and couverture are co-extruded with the ice confection from a first volume and supercooled couverture extruded from a second volume thermally separated from the central volume to contact a surface of the ice confection. Preferably the extrusion volumes have cylindrical geometry to provide a layer of couverture enveloping the ice confection.

4 Claims, 1 Drawing Sheet

EXTRUSION OF MATERIALS

FIELD OF THE INVENTION

Ice confection products including a couverture, eg of chocolate, are popular with the public. This invention relates to the co-extrusion of an ice confection and a fat containing couverture to form a product having couverture on the external surface of an ice confection.

BACKGROUND OF THE INVENTION

There is no criticality in the ice confection provided it is extrudable. Thus milk containing confections are preferred, for example ice cream, ice milk, frozen yoghurts and frozen custards. However, the invention is also applicable to water ices and sorbets. The ice confection will usually be aerated with an overrun in the range about 50% to about 200%. Ice confections have been well characterised in the literature, examples are "Ice Cream" by W. S. Arbuckle (published by AVI 1986—4th Ed) and J. Soc. Dairy Technology 1990, 43 (1) p17–20.

The couverture will usually, but not essentially, contain chocolate fat and will contain from about 20%, preferably to about 85% fat. Such compositions are well characterised in the literature, examples are Kirk-Othmer (2nd edition 1964) vol 5 page 363 et seq. and Elements of Food Technology p579 et seq.

GENERAL DESCRIPTION OF THE INVENTION

The invention provides a method of coextruding ice confection and a fat-containing couverture containing from about 20%, preferably to about 85% by weight, fat wherein ice confection at a temperature in the range above $-2°$ C. to about $-25°$ C. is extruded from a first volume and molten supercooled fat-containing couverture is extruded from a second volume thermally separated from the central volume, preferably by a vacuum chamber, to contact an external surface of the extruded ice confection. The thermal separation can also be provided by materials of low thermal conductivity.

Supercooling of the fat-containing couverture increases its viscosity which allows the extruded couverture to retain its shape and thickness. The supercooled couverture also retains its plasticity which allows the coextruded product to be shaped by twisting or bending for a time after extrusion. Preferably the chocolate was not tempered in order to give good eating characteristics at the temperatures of an ice confection. An extruded supercooled tempered couverture will give a harder bite at ice confection temperatures. This eating characteristic would be preferably used in layers. The supercooled material may contain a proportion of crystalline fat, but remain extrudable. A supercooled fat-containing material is at a temperature below that at which the fat crystallises, and crystallises without further reduction in temperature. The supercooled state exists because of the induction time for crystallisation and/or the slow kinetics of solidification and/or the lack of nucleation sites.

A circular geometry will be that normally used because the apparatus can be prepared using normal manufacturing procedures. However other sectional forms, eg ovals, rectangular and square sections can be formed by having the appropriate nozzle shapes. That is the apparatus can have circular geometry with only the nozzle ends having another section.

The method is also applicable to the extrusion of couverture within a volume of ice confection with the requirement for appropriate apparatus and thermal insulation. The ice confection and couverture may also be extruded as layers; which may be interleaved and are preferably flat.

The thickness of the couverture layer can be changed by altering the relative extrusion speeds of the ice confection and supercooled material. With a take off conveyor speed below the extrusion speed, the product is given waves or corrugations when the materials are coextruded as flat layers.

LITERATURE

Patent specification SU 664626 (Demidenko et al) describes ice cream extruded together with a coating material using a cylindrical barrel. This specification does not identify the benefits of having the coating material supercooled.

SPECIFIC DESCRIPTION OF THE INVENTION

An example of the process of the invention will now be given to illustrate, but not limit, the invention with reference to the accompanying diagrammatic drawing in which:

FIG. 1 is a longitudinal section view of an apparatus for performing the process.

An elongate central mandrel 1 is fixed at its end 2 to be held in a horizontal position. Nozzle barrel 3 is positioned around the free end of mandrel 1 and is adapted to receive a flow of fat containing couverture via inlet 5 with any excess going through outlet 6. Barrel 3 has an inwardly directed lip 4 and contains second volume 3A through which the couverture passes.

An inner nozzle barrel 7 is slidably mounted between mandrel 1 and barrel 3. Barrel 7 defines, with mandrel 1, a cylindrical central extrusion volume 8 which connects with inlet 9 through which an ice confection, usually ice cream, is supplied. The downstream end of barrel 7 has an external cylindrical vacuum chamber 10. The thermal separation between volumes 8 and 3A can also be provided by solid insulating materials, eg ceramics.

This chamber 10 is evacuated by a pump (not shown) via conduit 11. A high vacuum is applied during use. Barrel is slidable relative to mandrel 1 on contact surface 12 and on the radially inner surface of barrel 3 at seal 13.

Movement of barrel 7 to the right, as seen, brings the inwardly facing surface 4A into sealing contact with the external cylindrical surface of vacuum chamber 10. This contact seals the area through which the fat containing couverture is extruded. The nozzle area through which ice confection is extruded is sealed by inclined surface 7A abutting a corresponding surface on the mandrel head 1A. Movement of barrel 7 leads to closure of the two extrusion areas or selection of different areas to allow variation in the rate of extrusion.

In operation ice cream having the composition

| Ingredient | Weight % |
| --- | --- |
| Skimmed milk powder | 9.00 |
| sucrose | 16.00 |
| cream (48% fat) | 26.00 |
| stabilising agent | 0.30 |
| emulsifying agent | 0.60 |
| flavour | 0.25 |
| water | 47.85 | and an overrun of 100% was introduced into volume 8 and extruded between mandrel head 1A and the nozzle lip 4 at a rate of 5.5 liters min$^{-1}$ to give a rod having a diameter of 12 mm. The fat containing couverture was untempered, had a composition of cocoa-butter fat of 32% to 43% and was extruded at a rate of 0.3 liters min$^{-1}$ at a temperature of 22° C. to give a couverture layer on the ice cream rod having a thickness of 2 mm. The method of the invention allows a couverture layer having a thickness of 0.1 mm and upwards to be deposited. The extrusion speed was 8 m. min$^{-1}$.

Previous to being pumped into inlet 5 the couverture had been supercooled to produce a plastic extrudable material. This supercooling was achieved by cooling from 47° C. to 22° C. in less than 2 minutes. Couverture of this form remains plastic for a period after contacting the ice cream. This property allows the co-extruded rod to be shaped by twisting or bending after extrusion. For example bending the extrusion into a helix will provide a bar like product. Supercooling occurs when a fat containing material is rapidly cooled below its solidification temperature. The material will solidify at a rate proportional to the temperature below the solidification temperature. The supercooled material will be in a metastable form.

The downstream rim of vacuum chamber 10 is tapered to ensure the ice cream and couverture contact without exposure to air.

The coextruded product may be subjected to further stages of applying layers of ice cream and couverture to provide a product having a plurality of couverture layers between layers of ice confection.

I claim:

1. A method of coextruding ice confection and a fat-containing couverture containing from about 20% by weight fat wherein ice confection at a temperature in the range about −2° C. to about −25° C. is extruded from a first volume and molten supercooled, fat-containing couverture is extruded from a second volume thermally separated from the first volume to contact an external surface of the extruded ice confection.

2. A method according to claim 1 wherein the ice confection is extruded from a central volume and couverture is extruded from a second volume to envelope the external surface of the extruded ice confection.

3. A method according to claim 1 wherein the couverture contains up to 85% by wt fat.

4. A method according to claim 1, wherein the thermal separation is provided by a vacuum chamber.

\* \* \* \* \*